United States Patent Office 3,150,679
Patented Sept. 29, 1964

3,150,679
CONTROL COCK
Pierre M. Roubeau, Palaiseau, and Paul Chaumette, Montrouge, France, assignors to Commissariat a l'Energie Atomique, Paris, France
Filed Apr. 11, 1960, Ser. No. 21,274
Claims priority, application France, Apr. 16, 1959, 792,216
4 Claims. (Cl. 137—375)

The invention relates to a new interchangeable control cock for liquid-conveying pipe-lines and which is particularly suitable for use at low temperatures; it is also concerned with the connection between the pipe-line and such cock.

The present invention relates to a control cock for liquid-conveying pipe-lines which is simple to construct, to assemble and to take apart, while insuring excellent thermal insulation.

In the control cock according to the invention, the opening and closing system for controlling the flow of liquid is constituted by a fixed, hollow, cylindrical member, having one or more lateral openings and terminating in a valve element, and a movable tube adapted to be displaced co-axially with regard to said hollow member until one end of the tube comes into contact with said valve element, the interiors of said hollow member and said movable tube forming the flow passage for the liquid through the cock.

The hollow member and the movable tube are located, in sealed manner, inside at least one co-axial tubular casing.

That part of the wall of said hollow member which is provided with said lateral opening or openings does not contact the tubular casing and is located at the end of the member which carries said valve element.

According to one constructional embodiment, at the end which is closed by said valve element, the movable tube terminates in an attached annular, cylindrical member, the double wall of the movable tube thus being interrupted at this region.

This cylindrical member can be of metal, plastic or any other material which is compatible with the nature of the fluid being conveyed.

The cock may be provided with hydraulic means for effecting displacement of the movable tube.

Opening of the flow passage through the cock can be effected by means different from that employed for closing such flow passage. For example, if opening is effected by the action of an auxiliary liquid on displacement means for the movable tube, closing can take place under the action of an opposing force created by a coil-spring; it is to be understood that these suggested means are in no way limiting.

The connection between the movable tube of the cock and the pipe for the fluid to be conveyed is effected by fitting them together by means of an intermediate tube and a ferrule; the movable tube is thus mounted co-axially in an extension of the said pipe. The same arrangement is employed for effecting connection between the hollow, cylindrical member carrying the valve element and the liquid pipe located at the other side of the cock. As a result, the inlet pipe into the cock, the outlet pipe from the cock, the movable tube and the hollow member which is provided with the valve element form a series of co-axial tubes.

Preferably, if exchange of heat with the surrounding medium is to be avoided, the movable tube of the cock is provided with double walls which are polished and plated, for example silvered, in order to reduce the effects of radiation.

In the construction of the cock and the connecting members, it is preferable to use tubes made of materials having the lowest possible thermal conductivity; if these tubes are of metal, it is preferable for the metal to have a thermal conductivity lower than 0.25 microtherm per cm./cm.$^2$ per second per ° C., or, better still, of the order of 0.05 to 0.15 as is the case, respectively, for constantan (alloy 40% Ni, 60% Cu) and nickel and chrome steels.

According to another preferred embodiment of the invention, the double-walled, movable tube is provided with means for creating a vacuum in the space between these walls, thereby even further to reduce heat exchange by conduction.

Because of their special construction, the cock according to the invention and the associated connecting members have many advantages, the chief of which are given below.

A very simple construction with very few parts, which results in a very low cost price.

Ease of assembly and of taking to pieces by means of guided interfitting; this facility permits rapid maintenance and cleaning, on the one hand, and makes it possible to modify the lay-out of the pipe circuits without risk of jamming or damage, on the other hand.

Interchangeability, making it possible to combine members, such as tubes, connectors, cocks, etc., in order to form more or less complex pipe circuits.

Very low rate of heat transfer of the parts which are in contact with the liquid, the rate of heat transfer in the cock being substantially equivalent to that of a section of piping of the same length.

Absence of joints affected by the temperature of the liquid being conveyed; as will be explained below, the arrangement according to the invention makes it possible to locate all of the joints in ambient temperature zones.

Several examples of an interchangeable cock and its manner of connection to pipe-lines for liquefied gases at low temperature, given by way of non-limiting example, will be described below with reference to the accompanying schematic FIGURES 1 to 3.

In the drawing figures, which are all axial sectional views.

Figure 1:
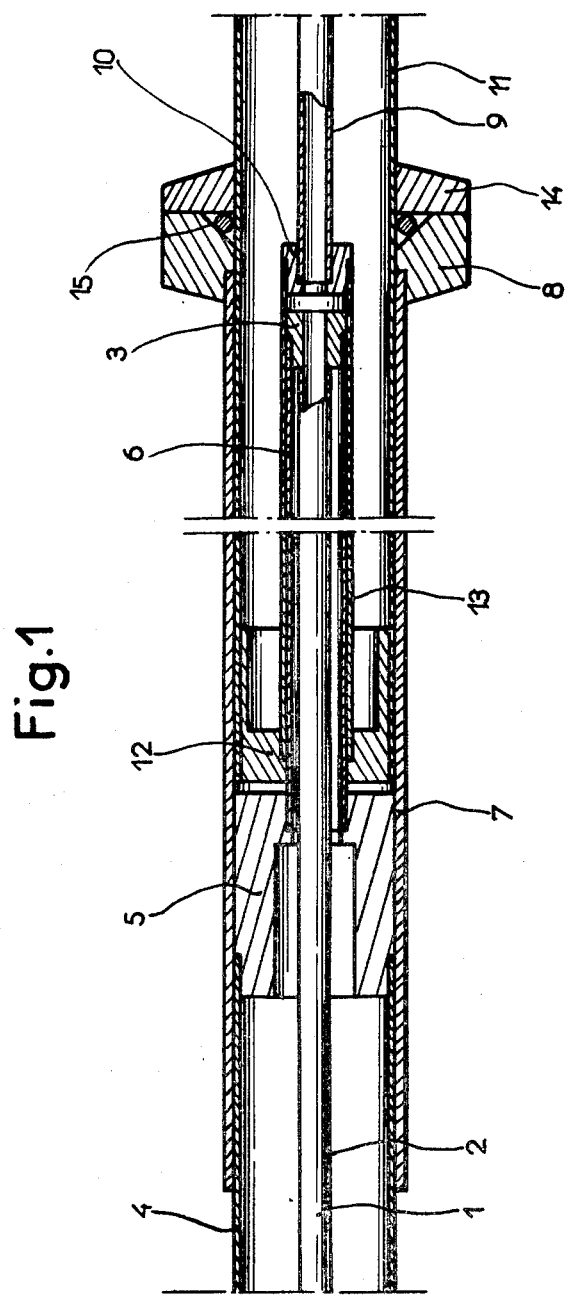
FIG. 1 shows a section of piping with a connection according to the invention.

In the section of piping shown in FIG. 1, the liquefied gas 1 circulates inside the central metal tube 2. This tube is provided at its end with an outer ferrule 3 and is surrounded by a co-axial casing 4 of brass. By means of a brass collar 5, the casing 4 is rigidly connected with a long skirt 6 secured to the outside of the ferrule 3. This assembly carries a brass sleeve 7 provided with a clamping flange 8 at its free end.

The skirt 6, and others which will be referred to later, is a thin walled tube of stainless steel or constantan or any other metal which is a poor conductor of heat but which has suitable mechanical properties.

In the same manner, in accordance with the invention, the end of the connecting pipe comprises a central tube 9 of stainless steel having an outer, metal ferrule 10; the tube 9 is surrounded by a co-axial casing 11 of brass. By means of a collar 12, this casing 11 is rigidly connected with a skirt 13 (similar to the skirt 6) fixed to the ferrule 10 and fitting telescopically outside the skirt 6 of the left-hand piping. Finally, the casing 11 carries a clamping flange 14 co-operating with the flange 8 of the sleeve 7, both flanges enclosing a flexible joint ring or like member 15.

It will be seen that the arrangement of the connector according to the invention is very simple and that the joint member 15 operates at the ambient temperature.

Figure 2:
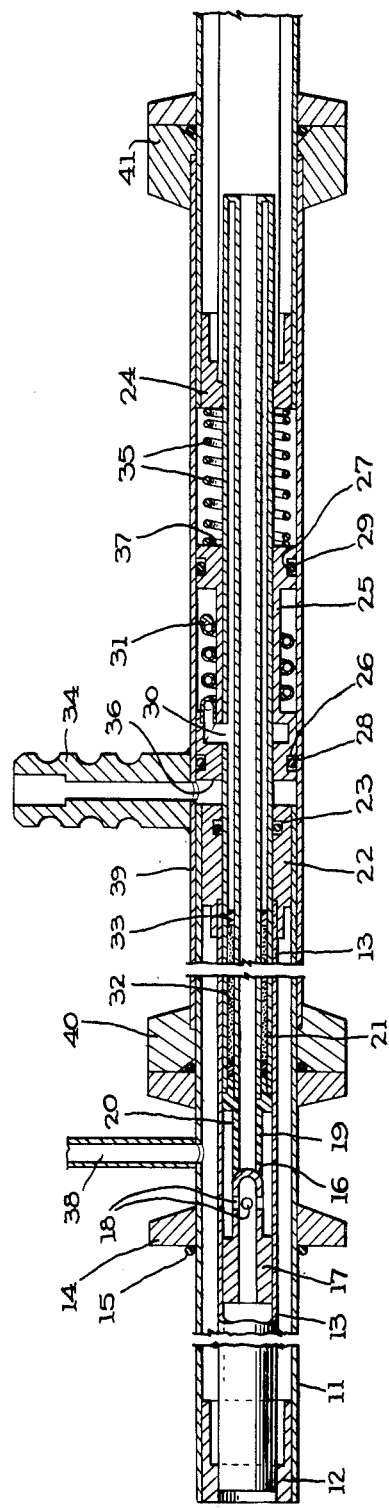
FIG. 2 shows a cock connected to a pipe-line.

The actual cock can be seen from FIG. 2; the connection of the cock to the left-hand pipe-line (not shown) is effected by means of the collar 12 made integral externally with the tube 11 and internally with the tube 13; the left-hand piping can comprise the pipe parts 1 to 8 of FIG. 1; references 11, 12 and 13 (FIG. 2) thus represent the same members as in FIG. 1; however, the right-hand part of the skirt 13 (FIG. 2) corresponds to the tube 9 (FIG. 2), the ferrule 10 being omitted and replaced by a hollow cylindrical member 17 which terminates in the valve-forming element 16; this fixed, hollow member is perforated laterally as shown at 18. The valve element 16 is arranged to enter into sealing engagement with the corresponding valve seat 19 which is movable axially and which is formed by one end of an annular member 20, the other end of which is located at the end of a movable, double-walled tube 21, the annular member 20 being made integral with the tube 21; thus, when the valve element 16 rests on the seat 19, the openings or perforations 18 no longer communicate with the bore of the tube 21.

The annular member 20, in this embodiment, is made of polyethylene having a high degree of polymerisation.

The tube 21 slides in the skirt 13. Skirt 13 is held at its end opposite valve seat 19 by a fixed collar 22 which encloses a flexible joint ring 23; tube 21 also slides in an annular member 24 which can simply be the ferrule of the right-hand piping section lying adjacent the cock. In addition, the tube 21 carries a piston sleeve 25, to which it is soldered, such piston sleeve being provided with two annular grooves 26 and 27 containing respectively the joint rings or like members 28 and 29.

In accordance with the invention, the space between the two walls of the tube 21 can be evacuated by means of the orifice 30 and the copper tube 31 which is then pinched and sealed with solder or tin. In known manner, activated carbon could be enclosed in space 32 of double walled tube 21 and held by wool, glass or quartz, located at 33, in tube 21 in order to complete the vacuum in the interior of the double wall part.

The tube 21 can slide in one direction under the influence of the pressure exerted by an auxiliary liquid introduced from outside by way of the tube 34 by known means, not shown, for applying and releasing fluid under pressure, and in the opposite direction under the action of an opposing force produced by a coil-spring 35.

Opening of the cock is ensured by the action of the auxiliary liquid on the face 36 of the piston sleeve 25 which moves the movable tube 21 with its seat 19 from the fixed valve element 16; closure is effected under the action of the spring 35 which, seating upon the annular member 24, pushes the tube 21 and thus the seat 19 in the reverse direction by its action on the face 37 of the piston sleeve 25 when the pressure of the fluid on surface 36 is released.

By means of a tube 38, for example of copper, the annular space between the skirt 13 and the casing 11 is evacuated in order to avoid calorific losses by conduction.

Finally, the body of the cock is surrounded by a jacket 39 (which carries the tube 34) provided with two clamping flanges 40 and 41 which serve for securement to the adjacent piping.

Figure 3:
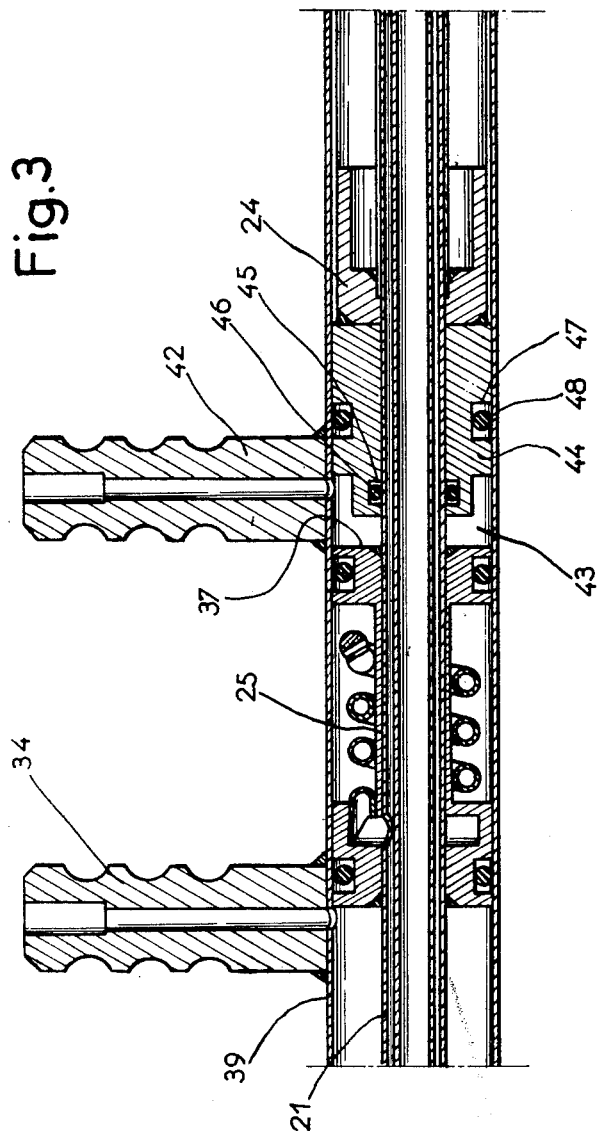
FIG. 3 shows a part of the cock of alternative form to that shown in FIG. 2.
Figure 4:
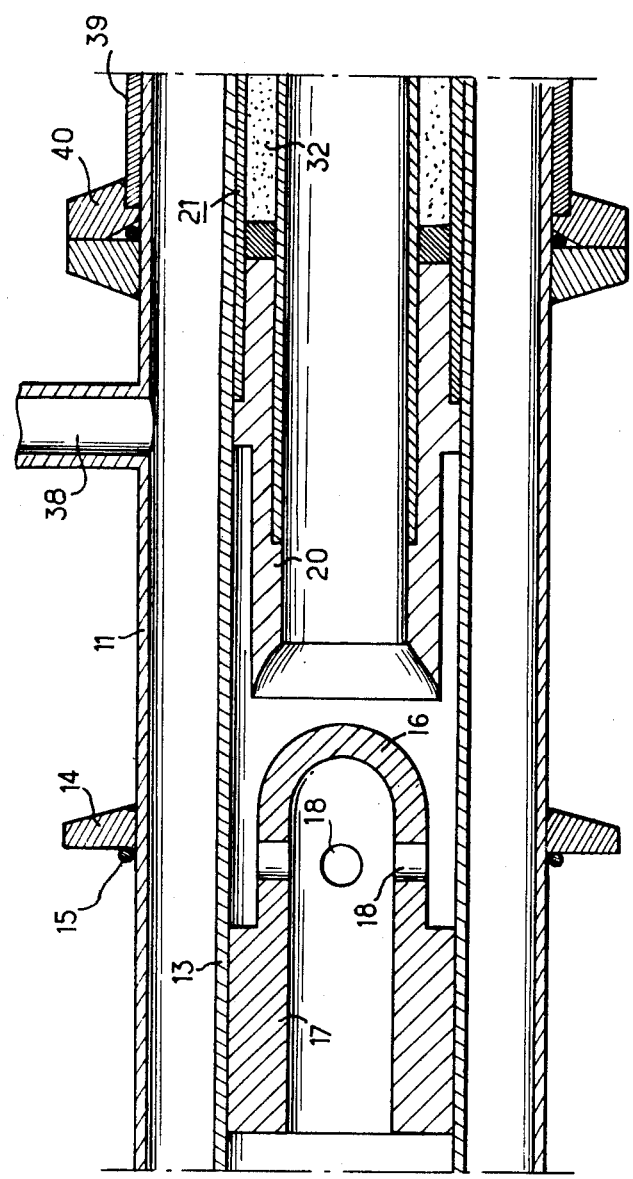
FIG. 4 is a detailed view of the opening and closing members of the cock according to FIG. 2, located in the open position.

FIG. 3 shows an alternative embodiment for opening and closing the cock forming the subject of the invention; this figure also shows the jacket 39 and the tube 34, as well as the double-walled tube 21 and its piston sleeve 25.

The opposing, cock-closing, action is ensured in this embodiment by the back-pressure of liquid introduced through a further tube 42 into the chamber 43; this liquid acts on the face 37 of the piston sleeve 25. The sealing of the chamber 43 is completed by a collar 44 provided with two annular cavities, the inner one 45 containing a joint ring 46 and the outer one 47 a joint ring 48.

We claim:

1. A control cock for a liquid conveying pipe-line, a fixed hollow cylindrical member connected to the pipe-line, a plurality of lateral openings in said member, a valve element at an end of said member, a movable tube slidably mounted co-axially with respect to said hollow member, one end of said tube engaging said valve element in fluid-tight seal to close said cock and to stop the flow of liquid, the interiors of said hollow member and of said tube forming the flow passage of the liquid through the cock, a collar, said tube passing in sliding relation through said collar, a piston sleeve, said tube being fastened to said piston sleeve and co-axially therewith, a jacket, said cylindrical member, said tube, said collar, and said piston sleeve being coaxially disposed within said jacket, said collar being fastened to the inner wall of said jacket, said piston sleeve being in tight slidable contact with the inner wall of said jacket, means opening through said jacket for applying a fluid pressure from a source exterior to said pipe to the interior of said jacket between said collar and said piston sleeve to open said cock, and means engaging said piston sleeve for biasing said movable tube toward said hollow member and toward cock closed position.

2. A cock as described in claim 1, said valve element and the perforated lateral wall of said hollow member having an outer diameter smaller than the outer diameter of the remainder of said hollow member.

3. A cock as described in claim 1 including a tubular member attached to the end of said movable tube forming the valve seat.

4. A cock as described in claim 1 in which said movable tube is double-walled.

References Cited in the file of this patent

UNITED STATES PATENTS

| | | |
|---|---|---|
| 263,731 | Shaw | Sept. 5, 1882 |
| 313,393 | Westinghouse | Mar. 3, 1885 |
| 447,275 | Berrenberg | Feb. 24, 1891 |
| 1,322,014 | Hanna | Nov. 18, 1919 |
| 1,611,611 | Russell | Dec. 21, 1926 |
| 2,243,711 | Lamb | May 27, 1941 |
| 2,260,151 | Miller | Oct. 21, 1941 |
| 2,301,428 | MacNeil | Nov. 10, 1942 |
| 2,416,787 | White | Mar. 4, 1947 |
| 2,831,326 | Richards et al. | Apr. 22, 1958 |
| 2,902,254 | Conway | Sept. 1, 1959 |

FOREIGN PATENTS

| | | |
|---|---|---|
| 17,095 | Great Britain | Aug. 25, 1913 |